US010755309B2

(12) United States Patent
Ferrari et al.

(10) Patent No.: US 10,755,309 B2
(45) Date of Patent: Aug. 25, 2020

(54) DELIVERING CONTENT

(71) Applicant: PIKSEL, INC., Wilmington, DE (US)

(72) Inventors: Gabriele Ferrari, Milan (IT); Giorgio Tornielli, Montara (IT); Stefano Valsecchi, Monza (IT)

(73) Assignee: PIKSEL, INC., Wilmington, DE (US)

( * ) Notice: Subject to any disclaimer, the term of this patent is extended or adjusted under 35 U.S.C. 154(b) by 419 days.

(21) Appl. No.: 15/321,607

(22) PCT Filed: Jun. 26, 2015

(86) PCT No.: PCT/EP2015/064614
§ 371 (c)(1),
(2) Date: Dec. 22, 2016

(87) PCT Pub. No.: WO2015/197862
PCT Pub. Date: Dec. 30, 2015

(65) Prior Publication Data
US 2017/0323336 A1    Nov. 9, 2017

(30) Foreign Application Priority Data
Jun. 26, 2014    (GB) .................................. 1411413.6

(51) Int. Cl.
*G06Q 30/00*     (2012.01)
*G06Q 30/02*     (2012.01)

(52) U.S. Cl.
CPC ..... *G06Q 30/0257* (2013.01); *G06Q 30/0201* (2013.01); *G06Q 30/0204* (2013.01); *G06Q 30/0269* (2013.01); *G06Q 30/0271* (2013.01)

(58) Field of Classification Search
CPC .......... G06Q 30/0257; G06Q 30/0204; G06Q 30/0201; G06Q 30/0271
See application file for complete search history.

(56) References Cited

U.S. PATENT DOCUMENTS 6,496,857 B1 * 12/2002 Dustin ................... G06Q 30/02
709/219
7,370,002 B2 * 5/2008 Heckerman ............ G06Q 30/02
705/14.41

(Continued)

FOREIGN PATENT DOCUMENTS

WO    2013015919 A2    1/2013

OTHER PUBLICATIONS

International Search Report and Written Opinion; dated Sep. 18, 2015, International Bureau of WIPO.

(Continued)

*Primary Examiner* — Luis A Brown
(74) *Attorney, Agent, or Firm* — Holzer Patel Drennan

(57) ABSTRACT

The invention relates to a user device comprising: an output component for outputting media content to a user; computer storage holding a user model of a user, the user model comprising personal information of the user; an input component configured to receive a content identification document identifying pieces of content to be output to the user by the output component: a content modifier configured to modify the document received by the input component based on the user model of the user, the content modifier operable to filter out at least one piece of content identified by the content document to generate a modified identification document, wherein the output component is configured to interpret each piece of content identified in the modified identification document for outputting to the user, wherein the filtered out piece(s) of content is not provided to the user.

19 Claims, 6 Drawing Sheets

(56) References Cited

U.S. PATENT DOCUMENTS

| | | | | |
|---|---|---|---|---|
| 8,676,900 | B2* | 3/2014 | Yruski | G06Q 30/02 705/14.1 |
| 2001/0021994 | A1 | 9/2001 | Nash | |
| 2002/0164977 | A1* | 11/2002 | Link, II | G06Q 30/0239 455/414.1 |
| 2003/0028871 | A1 | 2/2003 | Wang | |
| 2003/0139910 | A1* | 7/2003 | Yamamoto | H04L 63/08 702/188 |
| 2003/0154126 | A1* | 8/2003 | Gehlot | G06Q 30/0277 705/14.53 |
| 2003/0191742 | A1* | 10/2003 | Yonezawa | G06Q 30/02 |
| 2004/0015398 | A1* | 1/2004 | Hayward | G06F 40/103 705/14.49 |
| 2004/0044574 | A1* | 3/2004 | Cochran | G06Q 30/0261 705/14.57 |
| 2004/0088170 | A1* | 5/2004 | Nakanishi | H04N 21/4182 705/52 |
| 2004/0133467 | A1* | 7/2004 | Siler | G06Q 30/02 705/14.61 |
| 2005/0088320 | A1* | 4/2005 | Kovach | G07C 5/085 340/933 |
| 2005/0108095 | A1* | 5/2005 | Perlmutter | G06Q 30/04 705/14.53 |
| 2005/0125286 | A1* | 6/2005 | Crippen | G06Q 30/0273 705/14.69 |
| 2005/0144251 | A1* | 6/2005 | Slate | H04M 19/041 709/215 |
| 2005/0223100 | A1* | 10/2005 | Chen | G06F 16/9577 709/228 |
| 2006/0085517 | A1* | 4/2006 | Kaurila | H04L 67/16 709/217 |
| 2006/0129917 | A1* | 6/2006 | Volk | G06F 40/14 715/201 |
| 2006/0224951 | A1* | 10/2006 | Burke | G06F 16/957 715/234 |
| 2006/0248209 | A1* | 11/2006 | Chiu | G06Q 30/02 709/231 |
| 2006/0253323 | A1* | 11/2006 | Phan | H04H 20/106 705/14.53 |
| 2007/0038516 | A1* | 2/2007 | Apple | G06O 30/02 705/14.42 |
| 2007/0061711 | A1* | 3/2007 | Bodin | G06Q 10/10 715/234 |
| 2007/0073756 | A1* | 3/2007 | Manhas | G06Q 30/00 |
| 2007/0094081 | A1* | 4/2007 | Yruski | G06Q 30/0269 705/14.66 |
| 2007/0094083 | A1* | 4/2007 | Yruski | G06Q 30/0269 705/14.66 |
| 2007/0146812 | A1* | 6/2007 | Lawton | G06Q 30/02 358/452 |
| 2007/0225047 | A1* | 9/2007 | Bakos | H04M 1/7253 455/566 |
| 2008/0126476 | A1* | 5/2008 | Nicholas | G06Q 10/10 709/203 |
| 2008/0259906 | A1 | 10/2008 | Shkedi | |
| 2009/0011740 | A1 | 1/2009 | Aggarwal | |
| 2009/0171762 | A1* | 7/2009 | Alkove | G06Q 30/0273 705/14.42 |
| 2009/0183210 | A1 | 7/2009 | Andrade | |
| 2013/0060601 | A1* | 3/2013 | Kodialam | G06Q 30/02 705/7.29 |
| 2013/0086110 | A1 | 4/2013 | Kruger | |
| 2013/0282438 | A1* | 10/2013 | Hunter | H04W 4/029 705/7.32 |
| 2014/0157308 | A1* | 6/2014 | Ahern | H04N 21/2393 725/35 |
| 2015/0089384 | A1* | 3/2015 | Lewis | G06F 16/48 715/745 |
| 2015/0106841 | A1* | 4/2015 | Wolf | H04N 21/8455 725/32 |
| 2015/0287104 | A1* | 10/2015 | Gupta | G06Q 30/0277 705/14.71 |
| 2015/0339722 | A1* | 11/2015 | Hensgen | H04N 21/4113 705/14.64 |
| 2016/0292742 | A1* | 10/2016 | Kang | G06Q 30/0267 |
| 2016/0343041 | A1* | 11/2016 | Pistotnik | G06F 9/44526 |
| 2016/0381427 | A1* | 12/2016 | Taylor | H04N 21/23424 725/13 |
| 2017/0026701 | A1* | 1/2017 | Shaw | H04N 21/47202 |
| 2017/0032412 | A1* | 2/2017 | Scharber | G06F 16/24573 |
| 2017/0249663 | A1* | 8/2017 | Hajiyev | G06Q 30/0275 |
| 2017/0323336 | A1* | 11/2017 | Ferrari | G06Q 30/0201 |
| 2017/0332122 | A1* | 11/2017 | Shaw | H04N 21/44218 |

OTHER PUBLICATIONS

Search Report; dated Nov. 27, 2015; Great Brittan Intellectual Property Office.

* cited by examiner

```
<VAST version="2.0">
    <Ad id="156">
        ...
        <Duration>00:00:25</Duration>
        ...
        <MediaFile delivery="streaming" bitrate="256" width="480" height="352" type="video/x-flv">
            <http://example.com/video.flv>
        </MediaFile>
        ...
    </Ad>         } 602
    <Ad id="223">
        ...
    </Ad>         } 604
    ...
</VAST>
```

FIG. 6

DELIVERING CONTENT

TECHNICAL FIELD

This invention relates to delivering content to a user.

BACKGROUND

When using their devices nowadays, users are subject to potentially a very large amount of what is referred to as herein "auxiliary content". This is used to reference content which is not actually requested by a user but which is nevertheless directed to a user and played out at a user device (whether or not the user wants it). User devices include media players, such as digital video players, which are designed to play out at a screen or other output element of a user device auxiliary content which is received at that device in addition to content selected by a user.

Although users have not requested auxiliary content, they are generally tolerant of receiving and playing out a certain amount of auxiliary content, particularly where the receipt and play-out of that auxiliary content means that the user does not have to pay for the content that they did desire to receive. Auxiliary content can be provided in many different forms, including video content, static image, text based content, audio content. Although the present document is focussed mainly on the play-out of full media (video and audio) content, it will be appreciated that other forms of content are also available.

One particular type of auxiliary content is advertising content. The usual approach to targeted advertising consists in identifying users in a unique way, collecting user behaviour information either in an Ad server or in a dedicated remote system (a behavioural tracking system) and then using the collected information to classify the end-user to predefine behavioural classes. When the Ad server is being requested to provide advertising to a given user, the behavioural class the end user belongs to is then used to determine the most appropriate advert for him (for example, a user identified as a "Sportsman" is a likely candidate to receive advertising related to sports, goods and events). A disadvantage of this approach is that the user behaviour is collected by a third party behavioural tracking system and increasingly end-users are not tolerant to such a violation of their privacy. Already, many internet systems provide a "Do Not Track" feature that lets the end-users express a preference not to be tracked by websites. When the feature is enabled, advertising networks and other websites and applications are informed that the end-user has opted out of tracking for purposes like behavioural advertising and hence their behavioural information should not be collected. This means that users receive auxiliary content which is potentially of no relevance to them, but which consumes their time and device resources when played out.

SUMMARY

It is one aim of the present invention to provide targeted content delivery in a simplified manner which nevertheless does not impact the privacy of users. Targeted advertising has the advantage for the end-users that adverts that are shown to him are more likely to be relevant to him than ones returned by a "totally blind" Ad server. As already mentioned, advertising content is not the only kind of auxiliary content to which users are subjected, but similar issues apply to all kinds of auxiliary content which is not the desired content actually requested by a user but which is nevertheless targeted to and provided to a user.

One of the particular challenges overcome by the present invention is to permit targeted advertising in the context of a digital video player which is set up to playing out all information received in a particular auxiliary content document which is supplied to it.

One aspect of the invention provides a user device comprising: an output component for outputting media content to a user; computer storage holding a user model of a user, the user model comprising personal information of the user; an input component configured to receive a content identification document identifying pieces of content to be output to the user by the output component: a content modifier configured to modify the document received by the input component based on the user model of the user, the content modifier operable to filter out at least one piece of content identified by the content document to generate a modified identification document, wherein the output component is configured to interpret each piece of content identified in the modified identification document for outputting to the user, wherein the filtered out piece(s) of content is not provided to the user.

In embodiments, the output component may comprise a media player configured to play-out content identified in the modified identification document. The media player may comprise a video playback module configured to play-out the content.

The user device may comprise a network interface for issuing requests to an auxiliary content server and for receiving the content identification document from the auxiliary content server.

The user device may comprise a processor, wherein the output component, input component and content modifier are executable code sequences forming part of a media player executable by a processor.

The content modifier may comprise a self-categorisation module for receiving self-categorisation information from a user. The user device may comprise a user interface configured to enable a user to input such self-categorisation information. The self-categorisation module may comprise a role creation component which provides to a user a user interface to create one or more roles as a set of personal preferences for filtering content pieces from the content identification document. The self-categorisation information module may be arranged to selectively transmit self-categorisation information to an auxiliary content server. The self-categorisation information module may comprise a settable flag to indicate whether the self-categorisation information module is to transmit the self-categorised information to the auxiliary content server or to inhibit such transmission.

The user model may comprise local behaviour information derived from monitoring local behaviour of the user at the user device.

The content modifier may comprise logic operable to use information from the user model to select pieces of content to be filtered out. The logic may be replaceable by alternative logic by downloading the different code sequence to the content modifier whereby the same user information results in different pieces of content being filtered. The logic may automatically classify users to predefined classes and operates to filter pieces of content based on the automatic classification.

A set of modifiable rules may be stored in the computer storage as data accessible to the content modifier, which selects piece(s) of content to be filtered out according to those rules, whereby the stored rules can be modified so that the same user information results in different pieces of content being filtered out.

The content identification document may be received as a list of content identifiers with information about presentation of the content, and the content modifier may modify the content by removing a content identifier from the document.

The content identification document may be in accordance with the VAST standard.

Another aspect provides a media player in the form of a computer program on a computer recordable medium, the media player comprising: an output component for outputting media content to a user; an input component configured to receive a content identification document identifying pieces of content to be output to the user by the output component; and a content modifier configured to modify the document based on a user model of the user accessible by the content modifier, the content modifier operable to filter out at least one piece of content identified by the content document to generate a modified identification document, wherein the output component is configured to interpret each piece of content identified in the modified identification document for outputting to the user, wherein the filtered out piece(s) of content is not provided to the user.

In embodiments, the media may comprise a user interface module for displaying a user interface to a user for entering user-personal information for modifying the document. For a better understanding of the present invention and to show how the same may be carried into effect, reference will now be made by way of example to the accompanying drawings.

BRIEF DESCRIPTION OF DRAWINGS

FIG. 6 is an illustration of the structure of part of a VAST document.

DETAILED DESCRIPTION

Figure 2:
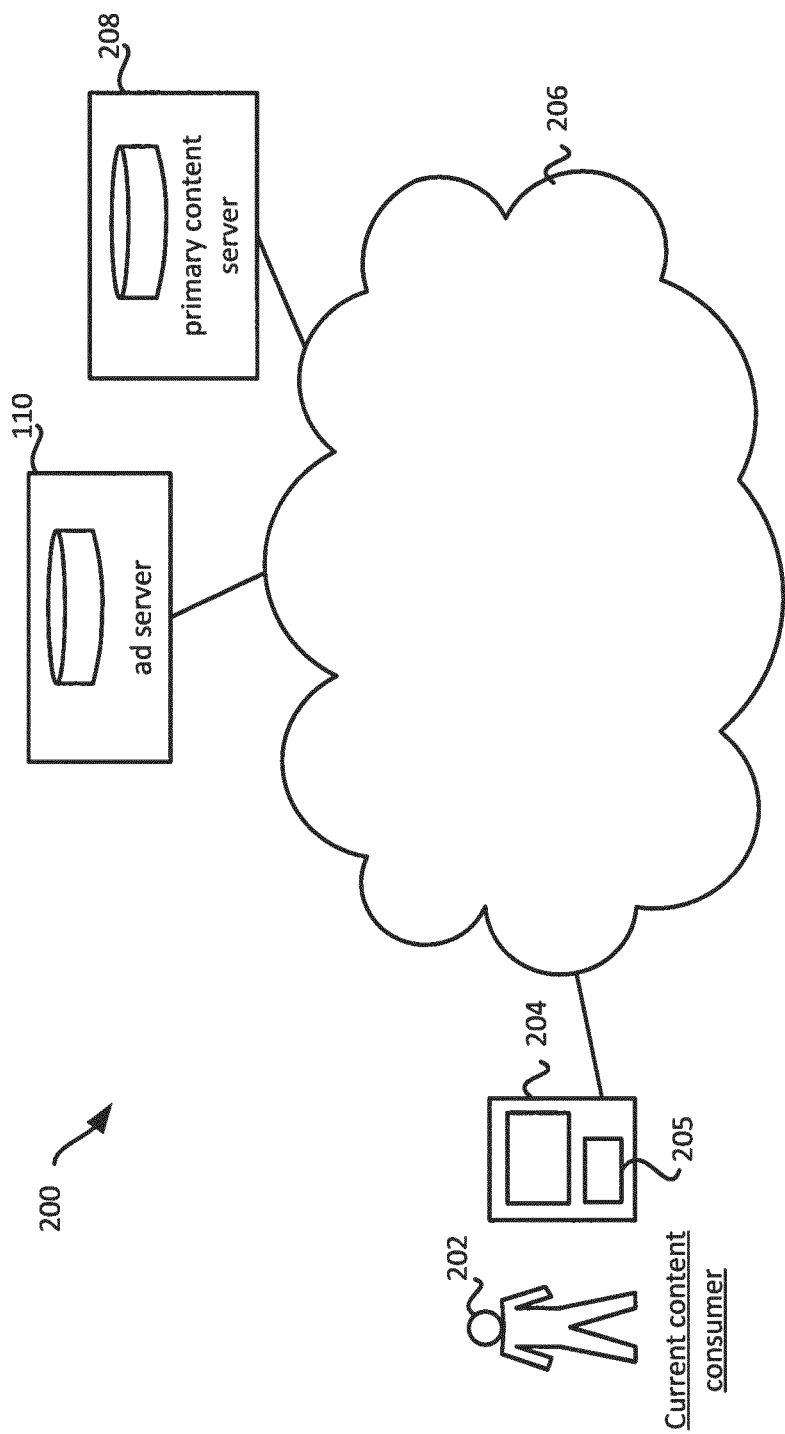
FIG. 2 is a schematic diagram illustrating the infrastructure of a communication system.

Reference is first made to FIG. 2 to show the infrastructure within which embodiments of the invention are implemented.

FIG. 2 shows a content delivery system 200. A content consuming user 202 (current content consumer) operates a first user device 204 capable of connecting to a computer network 206 of the content delivery system 200. The user device is a computer device in the form of, for example, a smartphone device, tablet computing device, personal computer ("PC"), smart-TV, set-top box, games console etc. The computer network is a packet-based network such as the Internet in this embodiment but may not be packet-based in other embodiments. The network connection can be wired such as Ethernet or wireless (either WiFi or GSM), or any suitable interface which allows the user device 204 to communicate with the network 206.

Connected to the network 206 is a primary content providing server 208 of the content delivery system 200 which holds primary (desired) content for delivering to users of the content delivery system 200. The media content is stored in the form of a collection of media assets (that is, individual pieces of media content), each media asset being, for example, an episode of a television show, a movie, or a recording of a sports event (e.g. football match) etc.

Also connected to the network 206 is an auxiliary content providing server 110 of the content delivery system 200 which holds an auxiliary content database identifying different pieces of auxiliary content (e.g. video content, static image content, text-based content, audio content etc.) that can be delivered to users of the content delivery system 200. For example, in some embodiments the database is a database of network locations (e.g. web addresses in the form of a Uniform Resource Locators (URLs)) at which the auxiliary content is available, that content being obtained either from the auxiliary content server itself or from some other device connected to the network 206. The database may also hold additional information in association with a piece of auxiliary media content, such as display data (e.g. defining a size of a piece of video or image content in pixels for use in displaying that piece of content at a user device) or other data (e.g. the duration of a piece of audio or video auxiliary content). In particular embodiments, the server 208 is an ad ("advertisement") server holding a database of advertising content.

The user device 204 executes a media player in the form of a media application (executable computer program) 205 which enables the user device 204 to communicate with both the primary content server 208 and the auxiliary content server 110 via the network 206.

In recent years video advertising has already been largely exploited in the context of free video portals such as You Tube. A set of standards have been defined by international bodies such as the Interactive Advertising Bureaux (IAB) for enabling seamless interaction among the different systems involved. In particular, video players in charge to execute the advertising locally need to communicate with Ad servers who are in charge to manage advertising campaigns and supply advertising to the player. In one implementation, these interact by means of VAST (Video Ad Serving Template) which is an XML document for serving Ads to digital video players, and describing expected video play behaviour when executing VAST-formatted Ad responses.

Figure 1:
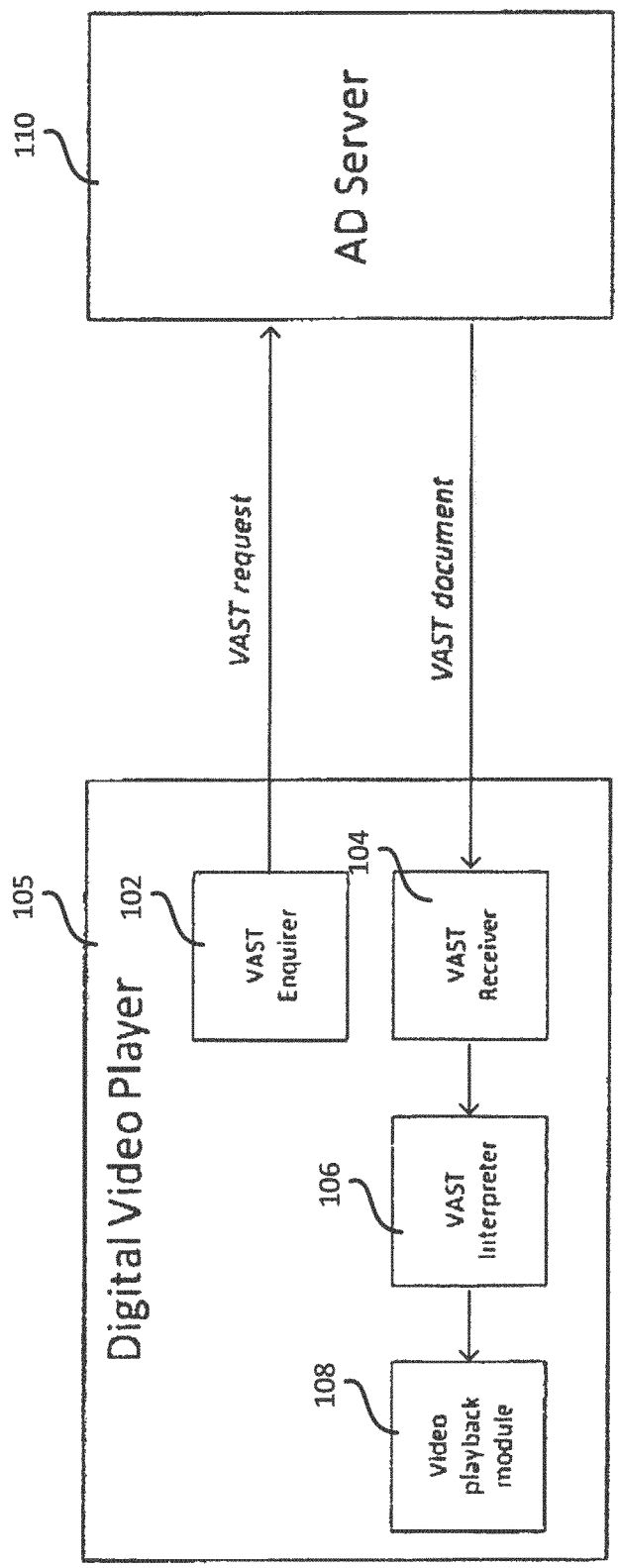
FIG. 1 is a schematic block diagram illustrating the relationship between a digital video player and an Ad server.

FIG. 1 illustrates the relationship between an Ad server 110 and a digital video player 105 provided by the media application at a user device. The digital video player 150 comprises modules which utilise the Video Ad Serving Template (VAST) specification. As illustrated in FIG. 1, a VAST enquirer 102 issues a VAST request to an Ad server 110 requesting auxiliary content (for example advertising content) to be returned to the video player 105. A VAST document is issued by the Ad server 110 in response to the VAST request and received by a VAST receiver 104 which serves as an input component of the video player. The document received by the receiver 104 is supplied to a VAST interpreter which interprets the content in the VAST document such that it can drive a video playback module 108. The vast interpreter and the playback module constitute an output component of the video player. Thus, when the video is played, the video player 105 sends a request to the Ad server 110 to get back advertising content to be shown and the associated information (e.g. tracking URL, how to show the advert etc.). The VAST document is received by the player, interpreted and finally the video playback module executes the advertising as specified in the VAST document. Thus, the video player is a pure executor of the advertising specified by the Ad server.

When used to supply targeted advertising appropriate to a particular user, the digital video player in FIG. 1 has the disadvantage that it is set up to play out all adverts which are returned from the Ad server in the VAST document. As mentioned above, attempts have been made to more appropriately target advertising, but these breach the privacy perceptions of users.

In accordance with embodiments of the present invention, an improved video player is provided which does not suffer from these disadvantages. This is discussed in more detail in the following.

Figure 4:
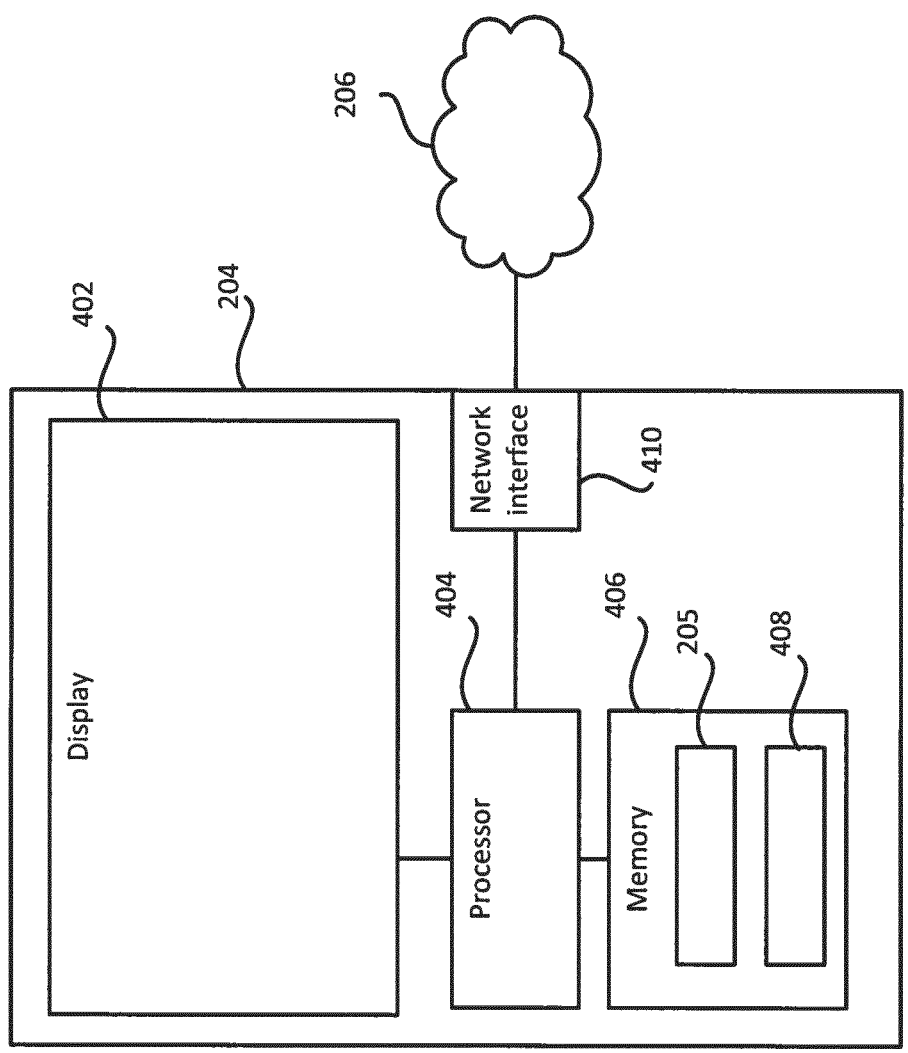
FIG. 4 is a schematic block diagram of a user device.

Further details of the user device 204 are shown in FIG. 4 which is a schematic block diagram of the user device 204. As shown in FIG. 4, the user device 204 comprises a network interface 410 for connecting to the network 206, a processor 404 in the form of one or more Central Processing Units ("CPUs"), a memory (computer storage) 406, and a media output element in the form of a display screen and loud speaker 402. The memory 406 is connected to the processor 404 and stores software in the form of program code for execution on the processor 404 which includes operating system code for managing hardware resources of the user device 104 and applications which cause the user device 204 to perform useful tasks above and beyond the mere running of the user device itself. The applications include the media application 205. The processor 404 is connected to the screen 402 to allow the screen to display media content and other information to the user 202. The processor is connected to the network interface 410 to allow data to be transmitted to and received from the network 206, which includes the receipt of both primary and auxiliary media content for outputting at the user device (e.g. for displaying on the screen 402) and the transmission of requests for such content to the appropriate network location. The screen may be a touchscreen configured to also receive inputs from the user 202, in which case it is also an input device of the user device 204, or the screen may not be a touch screen. The user device may comprise alternative or additional input devices such as a keyboard, mouse, television remote control, camera or infra-red depth sensor able to detect gesture commands etc. The input device can be used to permit a user to enter self-categorisation information and other personal information to be held locally as described later. The screen, network interface and memory are integrated into the user device 204. In alternative user devices, one or more of these components may not be integrated and may be connected to the processor via a suitable external interface (e.g. cabled interface such as USB or wireless interface such as Bluetooth or other wireless interface). For instance, the screen may be an external screen connected to the processor via a SCART, RCA or other similar interface.

The media application 205 has a user interface for presenting information to the user via one or more output devices of the user device 204 and to receive information from the user via one or more input devices of the user device 204. In particular, the user interface controls the display 402 to present visual information to the user 202.

The memory 406 also holds a user model 408 of the user 202 which contains personal information of the user 204 held locally at the user device 202. The user model includes information about the user's auxiliary content preferences and one or more behavioural classes to which the user is classified as belonging. In accordance with embodiments of the invention the media application 205 can, when executed, access the user model 408 in order to tailor the delivery of auxiliary content to that user. This is discussed in detail below.

Figure 3:
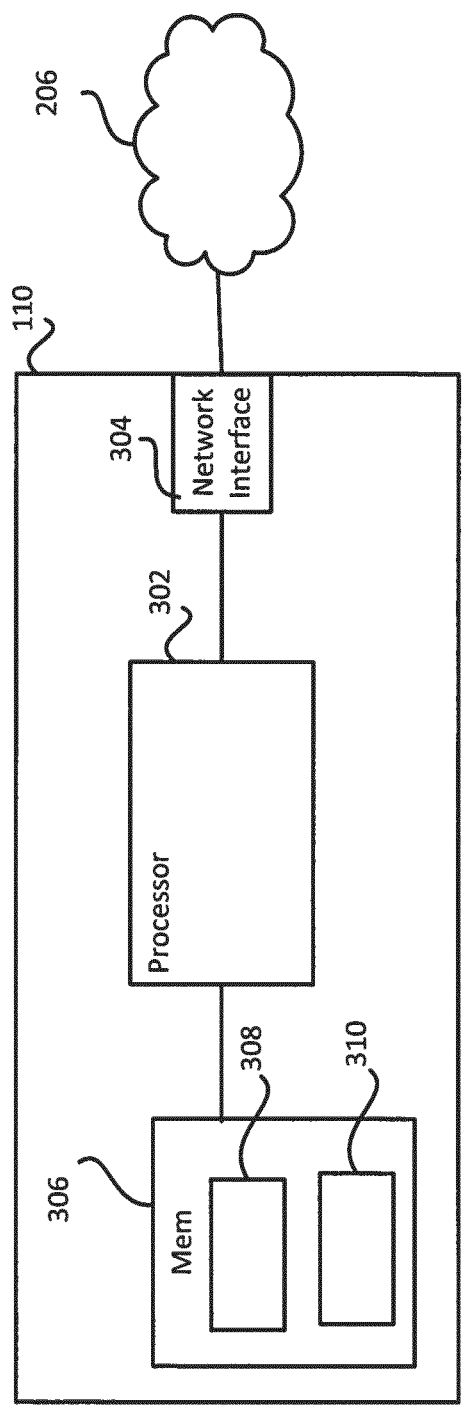
FIG. 3 is a schematic block diagram of an auxiliary content providing server.

Further details of the auxiliary content providing server 110 are shown in FIG. 3 which is a block diagram of the server 110. The server 110 comprises a processor 302 in the form of one or more CPUs, a network interface 304, and computer storage 306. The computer storage 306 is connected to the processor 302 and holds both code for execution on the processor and data. The data includes the auxiliary content database mentioned above (labelled 310 in FIG. 3). The processor is connected to the network interface 304 to allow data to be transmitted to and received from the network 206 by the server 110. The code includes auxiliary content provider code 308 which, among other things, responds to VAST requests with an appropriate VAST document populated with auxiliary content information from the database 310.

The media player can be provided in the form of a media application i.e. downloadable software to be executed in a local device, or the media player may be in the form of local embedded software e.g. embedded in a set-top-box. In either case, advantages over the player shown in FIG. 1 are achieved by the inclusion of additional modules in the media player as shown in FIG. 5.

Figure 5:
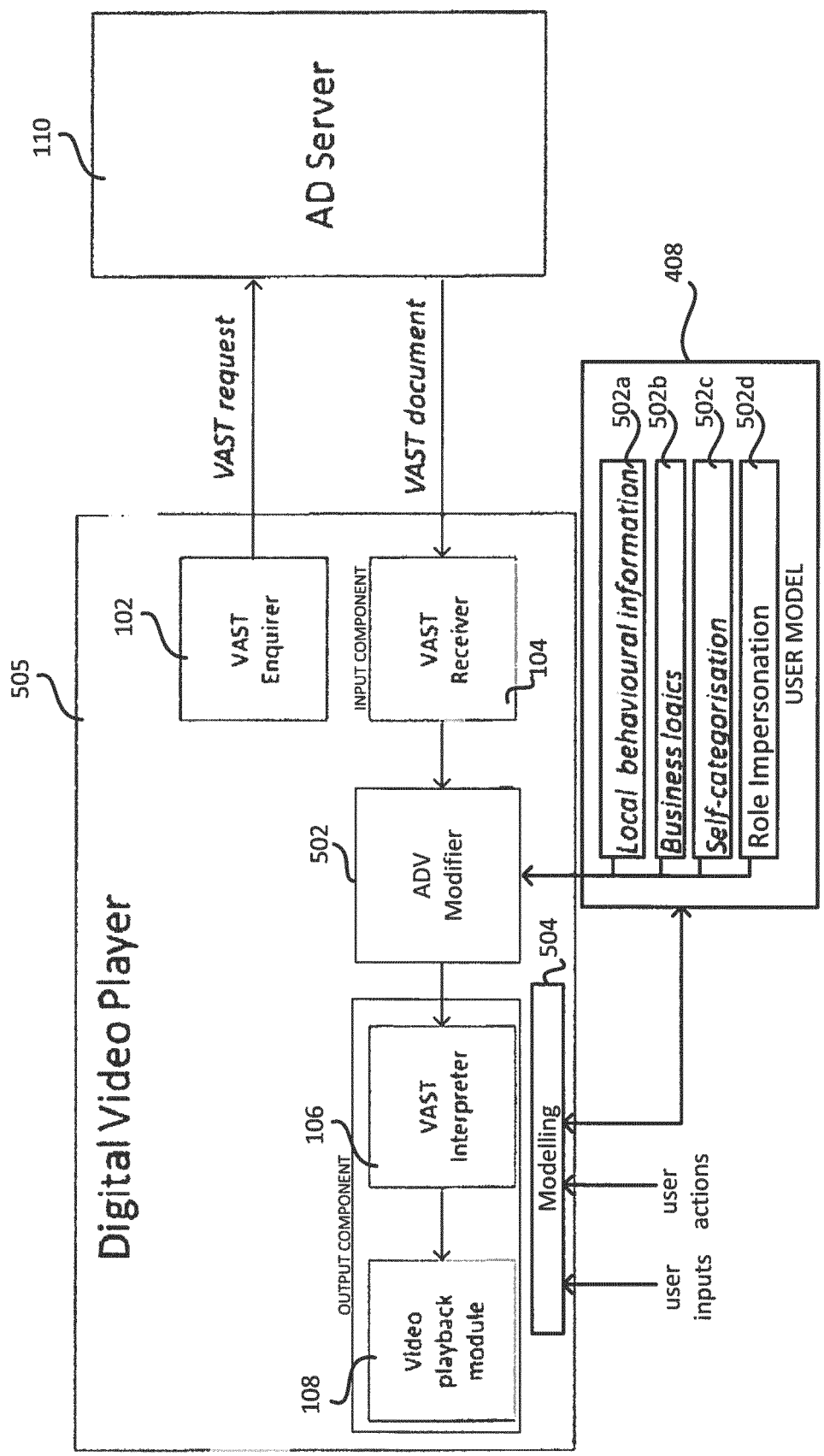
FIG. 5 illustrates a digital video player in accordance with an embodiment of the invention.

FIG. 5 illustrates a digital video player 505 in accordance with an embodiment of the invention. In this video player, a content modifier module 502 is inserted between the VAST receiver module 104 and the VAST interpreter module 106. The content modifier is in this embodiment an advert (ADV) modifier. The Ad modifier 502 operates to adapt the VAST document received from the Ad server 110 from the VAST receiver 104 which serves as an input component of the video player according to information in the user model located in the memory of the user device. The Ad modifier 502 generates at its output a new VAST document modified in accordance with the user model that can then be interpreted and executed by the video playback module already existing in the player. The interpreter 106 and playback module 108 constitute an output component of the video player. The content modifier is constructed in a sufficiently generic manner such that it can take as inputs both local behavioural information 502a (for example from the user model) and business logic for a set of rules 502b. Other characteristics which can be adapted by the local user include self-categorisation 502c and role impersonation 502d.

Behaviour of the content modifier can be changed over time by replacing logic 502b provided to the Ads modifier without changing the logical structure of the player. To this end, the video player 505 also includes a modelling module 504 which builds and maintains (modifies) the user model 408 that persists in the local storage of the user device, as denoted by the two-way arrow between the module 504 and the user model 408 in FIG. 5. This includes adding and changing the local behavioural information 502a, the business logics 502b (which may be user-specific to some extent), self-categorisation information 502c and role impersonation information 502d to the user model. Any or all of the information 502a-d can be held in the user model where it can be accessed by the ADV modifier 502, which reads the persisted user model 408 and uses those data for modifying the VAST document.

The modelling module 504 can improve the user model and save the updated user model in the local storage for future usage. For instance, the modelling module 504 can work behind the scenes (i.e. autonomously, rather than under direct control of the user) to collect actions received at a first input of the module 504 and classify the user based on those actions, or it may implement a function that can be explicitly activated by the user's inputs (received at a second input of the module 504) for entering the business logics/self-categorization (by a self-categorisation module of the modelling module 504)/role impersonation data. Business logic can be altered by the modelling module 504 downloading new rules into the user model for use by the Ads modifier 502 in the future.

By updating the user model in this manner, the modelling module 504 can change the behaviour of the content modifier module 502 without any changes to the logical structure of the player.

The solution described herein and offered by embodiments of the present invention is particularly useful in the context of providing targeted advertising which guarantees the privacy of end-user, but which yet can be provided in a simplified form. More specifically, by means of the user interface offered by the digital video player, the end-user can specify a set of preferences with respect to types of advertising which he is interested in and, similarly, types of advertising that he does not want to receive. Alternatively, the end-user can classify himself as belonging to one or more behavioural classes (e.g. sports, travel, car-addict etc.). The self-categorisation/set of preferences information provided by the end-user can then be used by the Ad modifier module 502 for filtering the advertising content returned in the VAST document by the Ad server and thus only present the user with relevant advertising content that he is interested in. In the case that no self-categorisation is present, the VAST document is not modified by the advertising modifier module and all adverts proposed by the Ad server are shown.

Self-categorisation does not involve correlations with behavioural data collected from other users, and furthermore, self-categorisation/set of preferences does not need to leave the user device and thus privacy is fully guaranteed.

Alternatively, the Ads modifier module could use the business logic to automatically classify the user to predefined classes based on his behaviour/user ID etc. and then use this knowledge to filter advertising content returned in the VAST document from the Ad server 110. Also, in this case information does not leave the user device and hence user privacy is not jeopardised.

FIG. 6 shows a simplified illustration of the structure of a VAST document. Each piece of auxiliary content (advertisement) includes an Ad ID which is followed by information about delivery and display of the Ad, including duration, media file delivery etc. This can also include a URL to the actual Ad itself if it does not come in the document.

In the context of embodiments of the present invention, reference numeral 602 denotes an advertisement which is required to be displayed by the local user, and 604 denotes an advertisement which will be modified out of the VAST document (filtered out) and will not be displayed, although it was received at the media player device.

A variant of self-categorisation described above consists in permitting the end user to impersonate different roles in different time instances or at different locations, such that the commercials presented to them could be more relevant to the actual situation of the end-user. A possible scenario where this feature could be used is when the end-user is planning a vacation; in this case he could classify himself as a traveller and therefore commercials from traveling agencies, cruise companies or tourism offices are shown. During the vacation he could change his role to a sportsman and a fan of music in order to receive advertising about the subjects.

In order to implement this scenario, the self-categorisation module could permit to create a role obtained as a combination of a set of preferences. Furthermore, it should permit to maintain multiple roles at the same time. Then the end-user from time to time can decide to play the role that best describes his current situation. Rules can be defined by entering data at a user interface prevented by the video player in the user's screen 402.

It is to be noted that self-categorisation information that in all the previous examples has been used as a pure filtering criteria could also be used when privacy is not an issue to inform the Ad servers of the user-preferences and therefore to already obtain a set of more relevant commercials in the VAST document which is received from the Ad server.

The self-categorisation module used by the end user to classify himself could also contain a binary flag permitting to specify if the self-categorisation information should only be used as a filtering criteria within the player or if it could be transmitted to the Ad server to get already pertinent commercials. When transmitted, it could be included in the VAST request.

The above described methods of adapting Ads returned by an Ad server based on local information and criteria, is not specific to the VAST format, but can be applied to any other document format exchange between Ad servers and digital video players.

Whilst in the above, behaviour of the content modifier is modified by modifying the user model, alternatively or additionally the behaviour could be modified by modifying the logic of the content modifier itself e.g. by downloading new code sequences.

It will be appreciated that the above embodiments have been described only by way of example, and other variants or applications may be apparent to a person skilled in the art given the disclosure herein. The scope is not limited by the described examples but only by the following claims.

The invention claimed is:

1. A user device comprising:
    an output component for outputting media content to a user;
    a memory for storing a user model of a user, the user model comprising personal information of the user;
    a modelling module connected to the user model and comprising:
        an interface to collect user actions to update a classification of the user in the user model based on those actions;
        an interface to receive user inputs to update the user model; and
        an interface to download new rules into the user model to alter a business logic of the user model;
    a network interface for issuing from the user device at least one request to an auxiliary content server for auxiliary content, wherein the user module is not transmitted from the user device for use by the auxiliary content server in selecting the auxiliary content;
    an input component configured to receive a content identification document from the auxiliary content server in response to the at least one request, the content identification document identifying pieces of auxiliary content to be output to the user by the output component as determined by the auxiliary content server in response to the at least one request; and
    a content modifier configured to:
        receive the content identification document from the input component identifying the pieces of auxiliary content determined by the auxiliary content server;

autonomously modify the received content identification document based on the user model of the user stored in the memory, the content modifier operable to filter the identified pieces of auxiliary content to remove at least one piece of auxiliary content identified by the content identification document to generate a modified content identification document; and output the modified content identification document to the output component for outputting auxiliary contents to the user, wherein the output component is configured to interpret each piece of auxiliary content identified in the modified content identification document for outputting to the user, wherein the at least one piece of auxiliary content removed from the received content identification document is not provided to the user, and wherein the behaviour of the content modifier is changed over time without any change to the logical structure of the user device.

2. A user device according to claim 1, wherein the output component comprises a media playback module configured to play-out content identified in the modified content identification document.

3. A user device according to claim 2, wherein the media playback module comprises a video playback module configured to play-out the content.

4. A user device according to claim 1, which comprises a processor, wherein the output component, input component and content modifier are executable code sequences forming part of a media player executable by a processor.

5. A user device according to claim 1, wherein the content modifier comprises a self-categorisation module for receiving self-categorisation information from a user.

6. A user device according to claim 5, wherein the interface to receive user inputs comprises a user interface configured to enable a user to input such self-categorisation information.

7. A user device according to claim 5, wherein the self-categorisation module comprises a role creation component which provides to a user the interface to receive user inputs to create one or more roles as a set of personal preferences for filtering content pieces from the content identification document.

8. A user device according to claim 5, wherein the self-categorisation module is arranged to selectively transmit self-categorisation information to the auxiliary content server.

9. A user device according to claim 8, wherein the self-categorisation module comprises a settable flag to indicate whether the self-categorisation module is to transmit the self-categorised information to the auxiliary content server or to inhibit such transmission.

10. A user device according to claim 1, wherein the user model comprises local behaviour information derived from monitoring local behaviour of the user at the user device.

11. A user device according to claim 1, wherein the content modifier comprises logic operable to use information from the user model to select pieces of content to be filtered out.

12. A user device according to claim 11, wherein the logic is replaceable by alternative logic by downloading the different code sequence to the content modifier whereby the same user information results in different pieces of content being filtered.

13. A user device according to claim 12, wherein the logic automatically classifies users to predefined classes and operates to filter pieces of content based on the automatic classification.

14. A user device according to claim 1, wherein a set of modifiable rules is stored in the computer storage as data accessible to the content modifier, which selects piece(s) of content to be filtered out according to those rules, whereby the stored rules can be modified so that the same user information results in different pieces of content being filtered out.

15. A user device according to claim 1, wherein the content identification document is received as a list of content identifiers with information about presentation of the content, and wherein the content modifier modifies the content by removing a content identifier from the document.

16. A user device according claim 1, wherein the content identification document is in accordance with a Video Ad Serving Template ("VAST") standard.

17. A computer program stored on a non-transitory storage medium, the computer program for implementing a media player which when executed on a computer comprises the steps of:

collecting user actions and updating a classification of the user in a user model based on those actions;

receiving user inputs to update the user model; and downloading new rules into the user model to alter a business logic of the user model;

requesting auxiliary content from an auxiliary content server, wherein the user module is not transmitted from the user device for use by the auxiliary content server in selecting the auxiliary content;

receiving a content identification document from the auxiliary content server in response to the at least one request, the content identification document identifying pieces of content to the output to the user by the output component as determined by the auxiliary content server;

autonomously modifying the received content identification document based on a user model of the user accessible by the content modifier; and filtering the identified pieces of auxiliary content to remove at least one piece of auxiliary content identified by the content identification document to generate a modified content identification document, wherein the output component is configured to interpret each piece of auxiliary content identified in the modified content identification document for outputting to the user, wherein the at least one piece of auxiliary content removed from the received content identification document is not provided to the user, and wherein the behaviour of the content modifier is changed over time without any change to the logical structure of the user device.

18. A computer program stored on a non-transitory storage medium, the computer program for implementing a media player according to claim 17, further for implementing a user interface module for displaying a user interface to a user for entering user-personal information for modifying the content identification document.

19. A method at a user device of outputting media content from the user device, the method comprising:

requesting auxiliary content from an auxiliary content server;

receiving a content identification document from the auxiliary content server identifying pieces of content to be output by the user device;

storing a user model of a user, the user model comprising personal information of the user;

collecting user actions and updating a classification of the user in the user model based on those actions;

receiving user inputs to update the user model;

downloading new rules into the user model to alter a business logic of the user model;

modifying the received content identification document based on the user model of the user, by filtering the identified pieces of auxiliary content to remove at least one piece of content identified by the received content document to generate a modified content identification document, wherein the behaviour of the content modifier is changed over time without any change to the logical structure of the user device; and outputting media content to a user by interpreting each piece of auxiliary content identified in the modified content identification document for outputting to the user, wherein the at least one piece of auxiliary content removed from the received content identification document is not provided to the user.

* * * * *